United States Patent
Rink et al.

(10) Patent No.: US 7,019,052 B1
(45) Date of Patent: Mar. 28, 2006

(54) LIQUID SUBSTANCE MIXTURES AND (CO)-POLYMERS, METHOD FOR THEIR PRODUCTION AND USE THEREOF FOR PRODUCING COMPLEX REACTIVE MIXTURES

(75) Inventors: Heinz-Peter Rink, Münster (DE); Werner-Alfons Jung, Ascheberg (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/830,694

(22) PCT Filed: Oct. 25, 1999

(86) PCT No.: PCT/EP99/08063

§ 371 (c)(1),
(2), (4) Date: May 14, 2001

(87) PCT Pub. No.: WO00/26312

PCT Pub. Date: May 11, 2000

(30) Foreign Application Priority Data

Oct. 31, 1998 (DE) ................................ 198 50 243

(51) Int. Cl.
*C08K 5/00* (2006.01)

(52) U.S. Cl. ...................... 523/456; 524/385; 524/386; 524/501; 524/507; 524/539; 524/591; 524/839; 524/840; 526/212; 526/329.7

(58) Field of Classification Search ................ 523/456; 524/385, 386, 501, 507, 539, 591, 839, 840; 526/212, 329.7
See application file for complete search history.

(56) References Cited

U.S. PATENT DOCUMENTS

| | | | |
|---|---|---|---|
| 4,246,382 A | 1/1981 | Honda et al. | 526/79 |
| 4,343,728 A | 8/1982 | Eschwey et al. | 523/456 |
| 4,710,542 A | 12/1987 | Forgione et al. | 525/137 |
| 4,732,945 A | 3/1988 | Dammann | 525/350 |
| 4,754,014 A | 6/1988 | Ryntz et al. | 528/28 |
| 4,826,617 A | 5/1989 | Dammann | 525/107 |
| 4,895,910 A | 1/1990 | Isoxaki et al. | 525/326.5 |
| 4,939,213 A | 7/1990 | Jacobs, III et al. | 525/329.9 |
| 5,079,312 A | 1/1992 | Isozaki et al. | 525/479 |
| 5,084,541 A | 1/1992 | Jacobs, III et al. | 528/45 |
| 5,514,746 A | 5/1996 | Schwarte et al. | 524/556 |
| 5,569,419 A | 10/1996 | Brenot et al. | 264/37 |
| 5,576,386 A | 11/1996 | Kempter et al. | 526/88 |
| 5,716,678 A | 2/1998 | Röckrath et al. | 427/407.1 |
| 5,726,258 A | 3/1998 | Fischer et al. | 526/64 |
| 5,759,631 A | 6/1998 | Rink et al. | 427/407.1 |
| 5,817,733 A | 10/1998 | Rink | 528/71 |
| 6,013,739 A | 1/2000 | Rink et al. | 525/451 |
| 6,187,384 B1 | 2/2001 | Wilke et al. | 427/388.4 |

FOREIGN PATENT DOCUMENTS

| | | |
|---|---|---|
| CA | 2190286 | 6/1995 |
| DE | 28 48 906 A1 | 5/1979 |
| DE | 37 06 095 A1 | 8/1987 |
| DE | 38 07 571 A1 | 9/1988 |
| DE | 43 10 414 A1 | 10/1994 |
| DE | 44 01 544 A1 | 7/1995 |
| DE | 44 07 409 A1 | 9/1995 |
| DE | 44 07 415 A1 | 9/1995 |
| DE | 44 21 823 A1 | 1/1996 |
| DE | 195 24 182 A1 | 1/1997 |
| DE | 195 34 361 A1 | 3/1997 |
| DE | 196 09 617 A1 | 9/1997 |

(Continued)

OTHER PUBLICATIONS

English language Abstract for DE19609617.

(Continued)

*Primary Examiner*—Bernard Lipman

(57) ABSTRACT

Liquid compositions and homopolymers or copolymers of olefinically unsaturated compounds, preparable by (co)polymerizing olefinically unsaturated compounds and reactive diluents for thermally curable multisubstance mixtures as reaction medium, and their use to prepare coating compositions, adhesives and sealing compounds.

13 Claims, No Drawings

FOREIGN PATENT DOCUMENTS

| | | |
|---|---|---|
| DE | 197 09 465 A1 | 9/1998 |
| EP | 0 026 875 A2 | 9/1980 |
| EP | WO 82/02387 | 7/1982 |
| EP | 0 245 700 B1 | 4/1987 |
| EP | 0 249 201 A2 | 6/1987 |
| EP | 0 276 501 A2 | 9/1987 |
| EP | 0 358 153 B1 | 9/1989 |
| EP | 0 502 839 A2 | 3/1992 |
| EP | 0 554 783 A1 | 1/1993 |
| EP | WO 93/17060 | 9/1993 |
| EP | 0 624 577 A1 | 5/1994 |
| EP | 0 708 788 B1 | 6/1994 |
| EP | WO 94/22968 | 10/1994 |
| EP | WO 95/27742 | 10/1995 |
| EP | WO 96/12754 | 5/1996 |
| EP | WO 97/12945 | 4/1997 |
| EP | 0 863 170 A1 | 9/1998 |
| WO | WO 92/22615 | 12/1992 |
| WO | WO 96/07688 | 3/1996 |
| WO | WO 97/46627 | 12/1997 |

OTHER PUBLICATIONS

English Translation of DE4310413.

English Translation of EP 0 708 788 B1.

Angewandte Chemie, vol. 107, pp. 2179 ff. (1995), in Joural of the American Chemical Society, vol. 118, p. 100 ff. (1996), Journal of the chemical Society, Checmical Communications, p. 1127 ff. (1195).

Progress in Organtic Coating, 23, " Recent developments in crosslinking technology for coating resins", (1994)ages 325-338.

Ullmanns Enzyklopadie der technischen Chemie, vol. 1, p. 743 ff. (1951).

M. Schuster and S. Bleckert in Angewandte Chemie, 1997, Voloume 109, pp. 2124 to 2144.

English language of EP 0 708 788 B1, entitled " Process for the preparation of polyurethane resins and their use and the use of ethoxyethyl prepionate for the preparation of polyurethane resins", pp. 1-38.

LIQUID SUBSTANCE MIXTURES AND (CO)-POLYMERS, METHOD FOR THEIR PRODUCTION AND USE THEREOF FOR PRODUCING COMPLEX REACTIVE MIXTURES

The present invention relates to novel liquid compositions and (co)polymers and also to novel processes for preparing them. The present invention further relates to the use of the novel liquid compositions and (co)polymers for preparing novel reactive multisubstance mixtures, especially coating compositions, adhesives and sealing compounds.

Multisubstance mixtures known today, especially coating compositions, such as clearcoat or topcoat materials, primer-surfacers, primers or motor vehicle underbody protection compositions, adhesives or sealing compounds, are based on binders which must have a large number of different properties in order that the requisite coating, bonding or sealing properties can be achieved. Such multisubstance mixtures, especially coating systems, are known, for example, from the German patents DE-A-44 07 415, DE-A-44 07 409 or DE-A-43 10 414. The disadvantage of all of these multisubstance mixtures is that the solids contents cannot be raised ad infinitum. With these systems, therefore, reducing the solvent emission is possible only within narrow limits.

To a certain extent, this situation may be remedied through the use of reactive diluents. The reactive diluent comprises a reactive diluter or solvent which, according to the definition of DIN 55945: 1996–09, becomes part of the binder during the film forming process, as a result of chemical reaction. The use of customary and known reactive diluents in coating systems, for example, may, however, be accompanied by problems, such as the incipient dissolution of other coats during application, or the lowering of the heat stability and light stability. Moreover, the addition of reactive diluents to the coating systems represents an additional process step, which in view of the process economy is fundamentally disadvantageous.

Furthermore, the addition of reactive diluents to the customary and known multisubstance mixtures is unable to remove the problem that, for the preparation of the binders, it is still necessary to use solvents, which then determine the overall solvent content of the reactive multisubstance mixtures. Although it is possible in some cases to prepare the binders by polymerization in bulk, i.e., without solvent, problems then arise during mixing with the other constituents of the reactive multisubstance mixtures, so that, ultimately, it is again necessary to have recourse to solvents.

It is an object of the present invention to provide novel liquid compositions and also novel (co)polymers which no longer have the disadvantages of the prior art but which instead allow reactive multisubstance mixtures which are virtually solvent-free to be prepared without additional process steps. It is a further object of the present invention to provide novel multisubstance mixtures, especially novel coating compositions, adhesives and sealing compounds, which are especially simple to prepare and use. Not least, it is an object of the present invention to propose a new process for (co)polymerizing olefinically unsaturated compounds.

The invention accordingly provides the novel liquid compositions and the novel (co) polymers, which are obtainable by (co)polymerizing olefinically unsaturated compounds in reactive diluents for thermally curable reactive multisubstance mixtures as reaction medium.

In the light of the prior art it was surprising and unforeseeable for the skilled worker that the object on which the present invention is based could be achieved by means of the novel liquid compositions and the novel (co)polymers. In particular, there was no reason to expect that the preparation of reactive multisubstance mixtures would be considerably simplified by the novel liquid compositions and novel (co) polymers.

In the text below, the novel liquid compositions are referred to as "compositions of the invention" and the novel (co)polymers are referred to as "(co)polymers of the invention".

Similarly, the novel reactive multisubstance mixtures are referred to as "multisubstance mixtures of the invention".

The compositions and (co)polymers of the invention are obtainable by (co)polymerizing olefinically unsaturated compounds.

Suitable olefinically unsaturated compounds are all monomers with a functionality of one or more which are customary and known in the field of plastics. In accordance with the invention it is of advantage to use monofunctional monomers, in order to prevent unwanted crosslinking or gelling of the (co)polymers during the preparation. In many cases, however, it may be of advantage to use monomers of higher functionality as well, in minor amounts.

Examples of suitable monomers for use in accordance with the invention are

A1) olefins such as ethylene, propylene, but-1-ene, pent-1-ene, hex-1-ene, cyclohexene, cyclopentene, norbornene, butadiene, isoprene, cyclopentadiene or dicyclopentadiene, A2) esters of (meth)acrylic acid which are substantially free from acid groups and hydroxyl groups, such as
(meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; or cycloaliphatic (meth)acrylic esters, especially cyclohexyl, isobornyl, dicyclopentadienyl, octahydro-4,7-methano-1H-indenemethanol or tert-butyl-cyclohexyl (meth)acrylate;
(meth)acrylic oxaalkyl esters or oxacycloalkyl esters such as ethyl triglycol (meth) acrylate and methoxyoligoglycol (meth)acrylate having a molecular weight Mn of preferably 550 or other ethoxylated and/or propoxylated, hydroxyl-free (meth)acrylic acid derivatives;
ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; or
trimethylolpropane di or tri(meth)acrylate or pentaerythritol di-, tri- or tetra(meth)acrylate;

A3) (meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl- or N,N-cyclohexylmethyl-(meth)acrylamide;

A4) monomers which carry per molecule at least one hydroxyl group and are substantially free from acid groups, such as
hydroxyalkyl esters of acrylic acid, methacrylic acid or another alpha,beta-ethylenically unsaturated carboxylic acid, which are derived from an alkylene glycol, which is esterified with the acid, or are obtainable by reacting the acid with an alkylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, and these hydroxyalkyl esters;

olefinically unsaturated alcohols such as allyl alcohol or polyols such as trimethylolpropane monoallyl or diallyl ether or pentaerythritol monoallyl, diallyl or triallyl ether;

A5) monomers which carry per molecule at least one acid group, preferably a carboxyl, sulfonic or phosphonic acid group, especially acrylic acid, methacrylic acid, ethacylic acid, crotonic acid, maleic acid, fumaric acid, itaconic acid, mono (meth) acryloyloxyethyl maleate, mono (meth)-acryloyloxyethyl succinate or mono(meth)acryloyl-oxyethyl phthalate;

A6) monomers containing epoxide groups, such as the glycidyl ester of acrylic acid, methacrylic acid, ethacrylic acid, crotonic acid, maleic acid, fumaric acid or itaconic acid;

A7) vinylaromatic hydrocarbons, such as styrene, alpha-alkylstryenes, especially alpha-methylstyrene, or vinyltoluene;

A8) nitriles such as acrylonitrile or methacrylonitrile;

A9) reaction products of the above-described monomers (A5) with the glycidyl ester of an alpha-branched monocarboxylic acid having from 5 to 18 carbon atoms per molecule, especially the reaction product of acrylic and/or methacrylic acid with the glycidyl ester of Versatic acid;

A10) vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether or vinyl cyclohexyl ether; vinyl esters such as vinyl acetate, vinyl propionate, vinyl butyrate, vinyl pivalate or the vinyl ester of 2-methyl-2-ethylheptanoic acid, or vinyl esters of alpha-branched monocarboxylic acids having from 5 to 18 carbon atoms in the molecule, which are obtained by reacting formic acid or carbon monoxide and water in the presence of a liquid, strongly acidic catalyst with propylene trimer, propylene tetramer or diisobutylene or with olefins which are cracking products of paraffinic hydrocarbons such as mineral oil fractions and contain both branched or straight-chain acyclic and/or cycloaliphatic olefins;

A11) polysiloxane macromonomers which have a number-average molecular weight Mn of from 1 000 to 40 000, preferably from 2 000 to 20 000, with particular preference from 2 500 to 10 000, and in particular from 3 000 to 7 000, and which contain on average 0.5 to 2.5, preferably from 0.5 to 1.5, ethylenically unsaturated double bonds per molecule, as are described in DE-A-38 07 571 on pages 5 to 7, in DE-A 37 06 095 in columns 3 to 7, in EP-B-0 358 153 on pages 3 to 6, in U.S. Pat. No. 4,754,014 in columns 5 to 9, in DE-A 44 21 823 or in the international patent application WO 92/22615 on page 12 line 18 to page 18 line 10, or acryloxysilane-containing vinyl monomers, preparable by reacting hydroxy-functional silanes with epichlorohydrin and then reacting the reaction product with methacrylic acid and/or hydroxyalkyl esters of (meth)acrylic acid;

In accordance with the invention, accordingly, the monomers may be selected such that the (co)polymerization results in any desired polymers and copolymers, such as polyolefins, polystyrenes, polybutadienes, polyisoprenes, polyvinyl chlorides, polyacrylonitriles, polyvinyl acetates or polyacrylates, for instance.

In accordance with the invention, however, it is of advantage to select the monomers such that the (co)polymerization results in binders for thermally curable reactive multisubstance mixtures. In the context of the present invention, thermally curable reactive multisubstance mixtures are coating compositions, adhesives or sealing compounds which in addition to the binder or binders comprise at least one crosslinking agent which with the binders on heating constructs a three-dimensional thermoset network.

Such crosslinking reactions are customary and known in the fields of the coating compositions, adhesives and sealing compounds and are described, for example, in the article by M. Ooka and H. Ozawa, "Recent developments in crosslinking technology for coating resins", in Progress in Organic Coatings, Volume 23, 325 to 338, 1994. Of the numerous known crosslinking reactions, preference is given to crosslinking reactions between hydroxyl groups and functional groups which are able to react with hydroxyl groups, and between epoxide groups and carboxyl groups.

Accordingly, the monomers used include those which carry reactive functional groups which are able to undergo crosslinking reactions with the crosslinking agents. Examples of suitable monomers of this kind are the monomers (A4), especially the hydroxyl-containing alkyl esters of acrylic acid and/or methacrylic acid, (A5), especially acrylic acid and/or methacrylic acid, or (A6), especially the glycidyl ester of acrylic acid and/or methacrylic acid.

In accordance with the invention it is especially advantageous to select the monomers such as to give hydroxyl-containing polyacrylates which contain minor amounts of monomers (A1), (A3) and/or (A7) to (A11) in copolymerized form. In this context, the term "minor amount", refers to a fraction of monomers which does not disadvantageously influence the advantageous profile of properties brought about by the acrylic monomers, but which instead varies it advantageously.

In accordance with the invention it is especially advantageous to select the monomers so as to give hydroxyl-containing polyacrylates which have an OHN of from 40 to 240, preferably from 60 to 210, acid numbers of from 0 to 80, preferably from 0 to 50, with very particular preference from 3.9 to 15.5, glass transition temperatures of from −35 to +70° C., preferably from −20 to +40° C., and number-average molecular weights of from 1 500 to 30 000, preferably from 1 500 to 15 000, with very particular preference from 1 500 to 5 000.

The glass transition temperature of the polyacrylate resins is determined by the nature and amount of the monomers used. The selection of the monomers may be made by the skilled worker with the aid of the following formula, by means of which the glass transition temperatures of polyacrylate resins may be approximately calculated:

$$1/Tg = \sum_{n=1}^{n=x} W_n/Tg_n; \quad \sum_n W = 1$$

Tg=glass transition temperature of the polyacrylate resin
$W_n$=weight fraction of the nth monomer
$Tg_n$=glass transition temperature of the homopolymer of the nth monomer x=number of different monomers Measures to control the molecular weight (e.g. selection of corresponding polymerization initiators, use of chain transfer agents, etc.) are part of the art knowledge of the skilled worker and need not be elucidated further here.

For the present invention it is important that the above-described monomers are (co)polymerized in at least one reactive diluent for thermally curable reactive multisubstance mixtures.

In accordance with the invention, suitable reactive diluents as the reaction medium are all those which, during the known crosslinking reactions which take place in the multisubstance mixtures of the invention, are incorporated into the binder and which do not hinder, let alone prevent, the homopolymerization or copolymerization of the monomers. The skilled worker will therefore be able to select the reactive diluents that are suitable in each case with the aid of his or her general knowledge in the art, where appropriate with the assistance of simple preliminary tests.

In accordance with the invention, advantageous reactive diluents are those which participate in the crosslinking
- of hydroxyl-containing compounds which carry functional groups that are reactive toward hydroxyl groups, or
- compounds containing epoxide groups with carboxyl-containing compounds.

Accordingly, the reactive diluents which are particularly preferred in accordance with the invention contain hydroxyl groups or epoxide groups.

Examples of reactive diluents particularly preferred in accordance with the invention are hyperbranched compounds containing a tetrafunctional central group derived from ditrimethylolpropane, diglycerol and/or ditrimethylolethane or a tetrafunctional central group of the general formula I

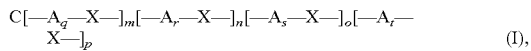  (I), in which the indices and variables have the following definitions:

m+n+o+p=4; where
m is an integer from 1 to 3, and
n, o and p are 0 or an integer from 1 to 3;
q, r, s and t are an integer from 1 to 5, where q≧r, s, t, especially q>r, s, t;
X is —O—, —S— or —NH—;
A is —CR$_2$—; where
R is —H, —F, —Cl, —Br, —CN, —NO$_2$, C$_1$–C$_3$ alkyl or haloalkyl or C$_1$–C$_3$ alkoxy radical or, if q, r, s and/or t are at least 2, R is a C$_2$–C$_4$ alkanediyl and/or oxaalkanediyl radical having 2 to 5 carbon atoms and/or an oxygen atom —O— which bridges from 3 to 5 carbon atoms of the radical —A—.

The term "derived" relates in this case to the imaginary abstraction of the hydrogen atoms from the hydroxyl groups of the tetraols.

In accordance with the invention, the central groups I are of advantage and are therefore used with particular preference.

In the general formula I the indices q, r, s and t denote integers from 1 to 5. In this case the index q may be equal to the indices r, s and t. In that case the resulting central groups I are symmetrical.

Examples of suitable symmetrical central groups I for use in accordance with the invention are derived from symmetrical tetraols such as pentaerythritol, tetrakis (2-hydroxyethyl) methane or tetrakis-(3-hydroxypropyl)methane.

In accordance with the invention, central groups I in which the index q is greater than the indices r, s and t and therefore has a value of at least 2 are of advantage and are therefore used with very particular preference. In that case, the resulting central groups I are asymmetric.

In the general formula I the indices m, n, o and p then add up to 4. The index m is always greater than 0 and represents an integer from 1 to 3, especially 1.

Subject to the above conditions, the indices n, o and p have the value 0 or represent an integer from 1 to 3. This means that it is not possible for each of these indices to adopt the value 0.

In accordance with the invention, the following value combinations of the indices are of advantage:
m=1 and n, o, p=1;
m=1, n=2, o, p=1;
m=1, n=2, o=1 and p=0;
m=1, n=3, o, p=0;
m=2, n=1, o=1 and p=0;
m=2, n=2 and o, p=0;
m=3, n=1 and o, p=0.

Of these numerical combinations, those in which m=1 are particularly advantageous.

In accordance with the invention, the following numerical combinations of the indices are of advantage:
q=2, r, s and/or t=1;
q=3, r, s and/or t=1 and/or 2;
q=4, r, s and/or t=1, 2 and/or 3;
q=5, r, s and/or t=1, 2, 3 and/or 4.

The variable —X— in the general formula I denotes divalent oxygen atoms —O— or sulfur atoms —S— or a secondary amino group —NH—. In accordance with the invention it is advantageous for —X— to be —O—.

The variable —A— in the formula I denotes a divalent radical —CR$_2$—.

The radical R therein represents hydrogen atoms —H, fluorine atoms —F, chlorine atoms —Cl, bromine atoms —Br, nitrile groups —CN, nitro groups —NO$_2$, or C$_1$–C$_3$ alkyl or haloalkyl or C$_1$–C$_3$ alkoxy groups. Examples of suitable groups of this kind are methyl, ethyl, propyl, trifluoromethyl, trichloromethyl, perfluoroethyl, perfluoropropyl, methoxy, ethoxy or propoxy groups.

Of advantage in accordance with the invention are hydrogen atoms or methyl groups, which are therefore used with preference. In particular, hydrogen atoms are used. Accordingly, the variables —A— particularly preferred in accordance with the invention are methylene groups.

If in the general formula I at least one of the indices q, r, s and/or t represents at least the number 2, the radical R may also represent a C$_2$–C$_4$ alkanediyl and/or oxaalkanediyl radical which cyclically bridges from 2 to 5 carbon atoms of the radical —A—. Alternatively, the radical —R— may represent an oxygen atom —O— which cyclically bridges from 3 to 5 carbon atoms in the radical —A—. Formed in this way are cyclopentane-1,2 or 1,3-diyl groups, tetrahydrofuran-2,3-, -2,4-, -2,5 or -3,4-diyl groups, cyclohexane-1,2-, -1,3- or -1,4-diyl groups or tetrahydropyran-2,3-, -2,4-, -2,5- or -2,6-diyl groups, but not epoxide groups.

Examples of central groups I which are especially advantageous in accordance with the invention are derived from the following tetraols of the general formula II:

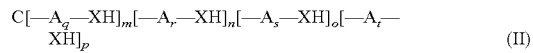  (II)

In the general formula II the indices and the variables have the same definitions as indicated above in connection with the general formula I. In accordance with the invention it is of particular advantage if the variable X is an oxygen atom —O—.

Accordingly, for the preparation of the central group I and of the compounds to be used in accordance with the invention, the tetraols of the general formula II are of particular advantage and are therefore used with particular preference. In the text below they are referred to for brevity as "tetraols II".

Examples of very especially suitable tetraols II for use in accordance with the invention are the symmetrical tetraols pentaerythritol, tetrakis(2-hydroxyethyl)methane or tetrakis (3-hydroxypropyl)-methane or the asymmetric tetraols (II1) to (II10):

  (II1)

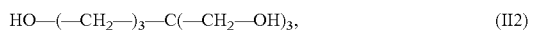  (II2)

  (II3)

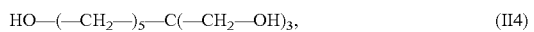  (II4)

  (II5)

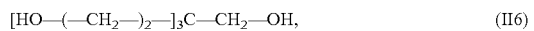  (II6)

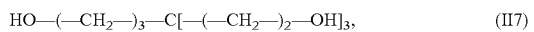  (II7)

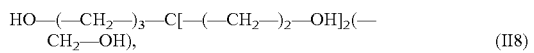  (II8)

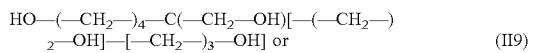  (II9)

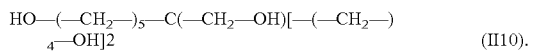  (II10).

Of these, particular attention is drawn to the tetraol (II1) (2,2-bishydroxymethyl-1,4-butanediol; homopenta-erythritol) because it imparts especially advantageous properties to the reactive diluents for use in accordance with the invention and hence to the compositions of the invention. For this reason it is used with very particular preference.

In the reactive diluents whose use is particularly preferred in accordance with the invention, the variables —X— described above are connected by way of spacer groups to in each case one hydroxyl group. This also applies analogously to the central groups which are derived from the tetraols ditrimethylolpropane, diglycerol or ditrimethylolethane whose oxygen atoms correspond to the variables —X—. The subsequent description of the spacer groups therefore also applies to these central groups which are different from the central groups I.

In accordance with the invention, all divalent organic radicals $R^1$ are suitable as spacer groups.

Examples of highly suitable divalent organic radicals $R^1$ are those derived from the following compounds:
(i) an alkane, alkene, cycloalkane, cycloalkene, alkylcycloalkane, alkylcycloalkene, alkenylcycloalkane, or alkenylcycloalkene, aromatic and heteroaromatic and also an alkyl-, alkenyl-, cycloalkyl-, cycloalkenyl-, alkylcycloalkyl-, alkylcycloalkenyl-, alkenylcycloalkyl- or alkenylcycloalkenyl-substituted aromatic or heteroaromatic; or
(ii) an abovementioned radical which contains at least one heteroatom in the chain and/or in the radical; or
(iii) a radical specified under (i) or (ii) whose chain and/or ring is substituted.

Examples of suitable substituents, for use in accordance with the invention, of the radicals $R^1$ are all organic radicals which are substantially inert, i.e., which do not undergo any reactions with the compounds used for the construction of the reactive diluents which are particularly preferred in accordance with the invention, or which are used for further reaction thereof, especially halogen atoms, nitro groups, nitrile groups or alkoxy groups.

The spacer groups are connected in particular by way of carbonyl groups to the central groups I or to the central groups which are derived from the other said tetraols.

Examples of organic compounds which are especially suitable for the preparation of these spacer groups are epsilon-caprolactone, hexahydrophthalic acid, hexahydrophthalic anhydride, phthalic acid, phthalic anhydride, hexahydroterephthalic acid, terephthalic acid, fumaric acid, maleic acid, maleic anhydride, itaconic acid, itaconic anhydride, oxalic acid, malonic acid, malonic anhydride, succinic acid, succinic anhydride, glutaric acid, glutaric anhydride, adipic acid, adipic anhydride, pimelic acid, suberic acid, azelaic acid, sebacic acid or decane-, undecane- or dodecanedicarboxylic acid. Of these, epsilon-caprolactone, maleic acid or maleic anhydride and hexahydrophthalic anhydride are especially suitable and are therefore used with particular preference.

In the preparation of the particularly preferred reactive diluents for use in accordance with the invention, the tetraols II or the other said tetraols are reacted with the abovementioned difunctional compounds to form an intermediate into which the hydroxyl groups may be introduced.

Suitable for this purpose are all organic compounds which are able to react with the intermediates to form a hydroxyl group or with retention of a hydroxyl group. In accordance with the invention it is of advantage to use a compound which reacts with the intermediates to form a hydroxyl group.

Examples of highly suitable organic compounds of this kind are compounds containing epoxide groups, especially compounds containing glycidyl groups.

Examples of highly suitable compounds containing epoxide groups, especially compounds containing glycidyl groups, are ethylene oxide, propylene oxide, epichlorohydrin, glycidol, glycidyl ether, especially aryl and alkyl glycidyl ethers, or glycidyl esters, especially the glycidyl esters of tertiary, highly branched, saturated monocarboxylic acids marketed under the trade name Versatic® acids by Deutsche Shell Chemie. Of these, the Versatic® acid glycidyl esters are especially advantageous and are therefore used with very particular preference.

For the present invention it is important that the above-described reactive diluents are liquid at room temperature. Consequently, either individual liquid hyperbranched compounds may be used, or liquid mixtures of these compounds. This is the case in particular when the high molecular weight and/or symmetry of the hyperbranched compounds used means that, as individual compounds, they are solid. The skilled worker will therefore be able to select the appropriate hyperbranched compounds in a simple manner.

The reactive diluents which are particularly preferred may be prepared by the customary and known methods of preparing hyperbranched and dendrimeric compounds. Appropriate synthesis methods are described, for example, in the patents WO 93/17060 or WO 96/12754 or in the book by G. R. Newkome, C. N. Moorefield and F. Vögtle, "Dendritic molecules, Concepts, Syntheses, Perspectives", VCH, Weinheim, N.Y., 1996.

Further examples of reactive diluents particularly preferred in accordance with the invention are the cyclic and/or acyclic $C_9$–$C_{16}$ alkanes functionalized with at least two hydroxyl groups or at least one hydroxyl group and at least one thiol group, and are referred to for brevity below as "functionalized alkanes".

The functionalized alkanes are derived from branched, cyclic or acyclic alkanes having from 9 to 16 carbon atoms, which in each case form the parent structure.

Examples of suitable such alkanes having 9 carbon atoms are 2-methyloctane, 4-methyloctane, 2,3-dimethyl-heptane, 3,4-dimethylheptane, 2,6-dimethylheptane, 3,5-dimethylheptane, 2-methyl-4-ethylhexane or isopropylcyclohexane.

Examples of suitable such alkanes having 10 carbon atoms are 4-ethyloctane, 2,3,4,5-tetramethylhexane, 2,3-diethylhexane or 1-methyl-2-n-propylcyclohexane.

Examples of suitable such alkanes having 11 carbon atoms are 2,4,5,6-tetramethylheptane or 3-methyl-6-ethyloctane.

Examples of suitable such alkanes having 12 carbon atoms are 4-methyl-7-ethylnonane, 4,5-diethyloctane, 1'-ethylbutylcyclohexane, 3,5-diethyloctane or 2,4-diethyloctane.

Examples of suitable such alkanes having 13 carbon atoms are 3,4-dimethyl-5-ethylnonane or 4,6-dimethyl-5-ethylnonane.

An example of a suitable such alkane having 14 carbon atoms is 3,4-dimethyl-7-ethyldecane.

Examples of suitable such alkanes having 15 carbon atoms are 3,6-diethylundecane or 3,6-dimethyl-9-ethylundecane.

Examples of suitable such alkanes having 16 carbon atoms are 3,7-diethyldodecane or 4-ethyl-6-isopropylundecane.

Of these parent structures, the alkanes having 10 to 14 and especially 12 carbon atoms are particularly advantageous and are therefore used with preference of these, in turn, the octane derivatives are especially advantageous.

For the present invention it is important that the functionalized alkanes which derive from these branched, cyclic or acyclic alkanes as parent structures are liquid at room temperature. Consequently, it is possible to use either individual liquid functionalized alkanes or liquid mixtures of these compounds. This is the case in particular when the high number of carbon atoms in the alkane parent structure of the functionalized alkanes used means that, as individual compounds, they are solid. The skilled worker will therefore be able to select the appropriate functionalized alkanes or reactive diluents in a simple manner.

For the invention it is also important that the functionalized alkanes have a boiling point of more than 200, preferably 220 and in particular 240° C. Furthermore, they ought also to have a low evaporation rate.

In accordance with the invention it is of advantage, furthermore, if the functionalized alkanes are acyclic.

The functionalized alkanes have primary and/or secondary hydroxyl groups or primary and/or secondary hydroxyl groups and thiol groups. In accordance with the invention it is of advantage if primary and secondary groups of this kind are present in one functionalized alkane.

The functionalized alkanes are accordingly polyols or polyol-polythiols, but especially polyols. These compounds may be used individually or together as mixtures. Particular advantages result if the polyols are diols and/or triols, but especially diols. They are therefore used with very particular preference.

Especially advantageous polyols are the positionally isomeric dialkyloctanediols, especially diethyloctanediols. Of these, particular attention is drawn to 2,4-diethyl-1,5-octanediol.

The reactive diluents described above are compounds which are known per se and can be prepared with the aid of customary and known synthesis methods of organic chemistry, such as base-catalyzed aldol condensation, or are obtained as by-products of chemical industrial syntheses such as the preparation of 2-ethylhexanol.

Further examples of reactive diluents particularly preferred are obtained by subjecting oligomers of the formula III

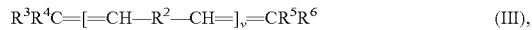

$$R^3R^4C=[=CH-R^2-CH=]_v=CR^5R^6 \quad \text{(III)},$$

in which $R^2$ is $-(-CH_2-)_w-$,
in which the index w is an integer from 1 to 6, or

in which W is $-CH_2-$ or an oxygen atom;
$R^3$, $R^4$, $R^5$ and $R^6$ independently of one another are hydrogen atoms or alkyl; and the index v is an integer from 1 to 15;

to hydroformylation and reducing the resultant products III, containing aldehyde groups, to the polyols III, which if desired are partially or fully hydrogenated.

The index v in the formula III represents the number of divalent radicals $R^2$ introduced by ring-opening metathesis reaction into the oligomers I derived from cyclic olefins such as, for example, cyclopropene, cyclopentene, cyclobutene, cyclohexene, cycloheptene, norbornene, 7-oxanorbornene or cyclooctene. Preferably, as great as possible a fraction of the oligomer mixtures III useful according to the invention, such as, for example, at least 40% by weight (determined by the area integration of the gas chromatograms; instrument: Hewlett Packard; detector: flame ionization detector; column: DB 5.30 m×0.32 mm, coverage 1 μg; temperature program: 60° C. 5 min., isothermal, heating rate 10° C./min, max.: 300° C.), have a value of v>1. The value v and thus the degree of ring-opening metathesis can be influenced, as specified later on below, by the activity of the metathesis catalyst that is used.

The radicals $R^3$, $R^4$, $R^5$ and $R^6$ are independently of one another hydrogen or alkyl, the expression "alkyl" embracing straight-chain and branched alkyl groups.

The alkyl groups in question are preferably straightchain or branched $C_1$–$C_{15}$, preferably $C_1$–$C_{10}$, with particular preference $C_1$–$C_5$, alkyl groups. Examples of alkyl groups are, in particular, methyl, ethyl, propyl, 1-methylethyl, butyl, 1-methylpropyl, 2-methylpropyl, 1,1-dimethylethyl, n-pentyl, 1-methylbutyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 3-methylpentyl, 4-methylpentyl, 1-2-dimethylbutyl, 1,3-dimethylbutyl, 2-3-dimethylbutyl, 1,1-dimethylpropyl, 1,2, 2-trimethylpropyl, 1-ethylbutyl, 2-ethyl-butyl, 1-ethyl-2-methylpropyl, n-heptyl, 1-methylhexyl, 1-ethylpentyl, 2-ethylpentyl, 1-propylbutyl, octyl, decyl, dodecyl, etc.

The degree of branching and the number of carbon atoms of the terminal alkyl radicals $R^3$, $R^4$, $R^5$ and $R^6$ depend on the structure of the acyclic monoolefins of the hydrocarbon mixture used and on the activity of the catalyst. As detailed below, the catalyst activity influences the degree of cross-metathesis (self-metathesis) of the acyclic olefins, with formation of structurally new olefins, into which then, formally, cyclopentene is inserted in a ring-opening metathesis polymerization.

Preference is given to the use of oligomer mixtures containing an increased fraction of oligomers having only one terminal double bond. The oligomer is preferably prepared by reacting a hydrocarbon mixture comprising a cyclic monoolefin such as cyclopropene, cyclobutene, cyclopentene, cyclohexene, cycloheptene, cyclooctene, norbornene or 7-oxanorbornene, and acyclic monoolefins as well, obtained from the processing of petroleum by cracking ($C_5$ cut), in a homogeneous or heterogeneous metathesis reaction.

The metathesis reaction formally comprises a) the disproportionation of the acyclic monoolefins of the hydrocarbon mixture by cross-metathesis, b) the oligomerization of the cyclic monoolefin by ring-opening metathesis, c) chain termination by reaction of the oligomers from b) with an acyclic olefin of the hydrocarbon mixture or of a product from a), it being possible to traverse steps a) and/or b) and/or c) a number of times, individually or in combination.

Step a)

The cross-metathesis of the acyclic monoolefins will be illustrated using the example of the metathesis of 1-pentene and 2-pentene:

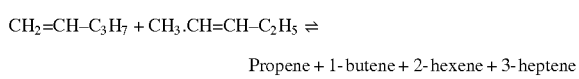

Propene + 1-butene + 2-hexene + 3-heptene

A combination, of cross-metathesis of different acyclic olefins and self-metathesis of identical acyclic olefins, such as, for example, the self-metathesis of 1-pentene to ethene and 4-octene, and multiple traversal of this reaction, produces a large number of monoolefins of different structure and with different carbon atom numbers, which form the end groups of the oligomers I. The proportion of cross-metathesis products, which increases as the activity of the catalyst used goes up, also influences the double bond content of the oligomers. Thus, for example, in the case of the self-metathesis of 1-pentene, described above, ethene is liberated, which may if appropriate escape in the form of a gas, removing one double bond equivalent from the reaction. At the same time, there is an increase in the fraction of oligomers without terminal double bonds. In the above example, therefore, an oligomer without terminal double bonds is formed, for example, by insertion of cyclic monoolefin into 4-octene.

Step b)

The average number of insertions of the cyclic monoolefin into the growing chain in a ring-opening metathesis polymerization determines the average molecular weight of the resulting oligomer mixture I. Preferably, oligomer mixtures I having an average molecular weight of at least 274 g per mole are formed by the process of the invention, which corresponds to an average number of three units of a cyclic monoolefin per oligomer.

Step c)

Chain termination takes place by reaction of oligomers that still have an active chain end in the form of a catalyst complex (alkylidene complex) with an acylic olefin; in the course of this reaction, ideally, an active catalyst complex is recovered. In that case, the acyclic olefin may originate unchanged from the hydrocarbon mixture originally used for the reaction, or may have been modified beforehand in a cross-metathesis in accordance with stage a).

Very generally, the process is suitable for preparing oligomers III from hydrocarbon mixtures which comprise acyclic and cyclic monoolefins: monoolefins such as, for example, cyclobutene, cyclopentene, cyclohexene, cycloheptene, norbornene or 7-oxanorbornene, especially cyclopentene. Variants of this process are described, for example, in the article by M. Schuster and S. Bleckert in Angewandte Chemie, 1997, Volume 109, pages 2124 to 2144.

Preference is given to the use of a hydrocarbon mixture obtained industrially in the processing of petroleum, it being possible if desired to subject said mixture to catalytic partial hydrogenation beforehand in order to remove dienes. A particularly suitable mixture for use in the present process is, for example, a mixture enriched in saturated and unsaturated $C_5$ hydrocarbons ($C_5$ cut). To obtain the $C_5$ cut it is possible, for example, first to subject pyrolysis benzine obtained in the steam cracking of naphtha to a selective hydrogenation in order to convert, selectively, the dienes and acetylenes present into the corresponding alkanes and alkenes, and subsequently to subject the product to a fractional distillation, producing firstly the $C_6$–$C_8$ cut, which is important for further chemical syntheses and comprises the aromatic hydrocarbons, and secondly the $C_5$ cut, which is used for the process of the invention.

The $C_5$ cut generally has a total olefin content of at least 30% by weight, preferably at least 40% by weight, in particular at least 50% by weight.

Suitable in this context are $C_5$ hydrocarbon mixtures having a total cyclopentene content of at least 5% by weight, preferably at least 10% by weight, in particular at least 12% by weight, and generally not more than 30% by weight, preferably not more than 20% by weight.

Furthermore, suitable $C_5$ hydrocarbon mixtures have a proportion of pentene isomers among the acyclic monoolefins of at least 70% by weight, preferably at least 80% by weight, in particular at least 90% by weight.

The preparation process can also be performed with a $C_5$ cut which is obtained industrially and has a total olefin content of, for example, from 50 to 60% by weight, such as about 56%, a cyclopentene content of, for example, from 10 to 20% by weight, such as about 15% by weight, and a pentene isomer content of, for example, from 33 to 43% by weight, such as about 38% by weight, with about 16% by weight being accounted for by the n-pentene and about 22% by weight by isomeric pentenes.

In one specific embodiment, the hydrocarbon mixture used in the preparation process comprises the $C_5$ Cut and a petroleum fraction containing acyclic $C_4$ olefins (raffinate 2).

In another specific embodiment of the preparation process, a hydrocarbon mixture is used which comprises the $C_5$ cut and ethene. In this case, oligomer mixtures III having an increased double bond content are obtained. This is achieved first by ethenolysis of the acyclic n- and iso-pentenes present in the $C_5$ cut to give shorter-chain α-olefins, such as propene and 1-butene, which react with cyclopentene in a ring-opening metathesis reaction to form oligomers III having in each case one terminal double bond. In addition, in the presence of ethene, the self-metathesis of the acyclic olefins to form further ethene, such as, for example, the self-metathesis of 1-pentene to form ethene and 4-octene, which as a chain terminating reagent leads to products without terminal double bonds, is suppressed. Secondly, a further increase in the double bond content is achieved by ethenolysis of cyclopentene with ethene to give 1,6-heptadiene. This results in sequences of oligomers each of which have two terminal double bonds. When oligomer mixtures III obtained in this way, having an increased double bond content, are used for the functionalization, the result is preferably oligomer mixtures III having an increased density of functionalities.

Suitable catalysts for the metathesis are known from the prior art and include homogeneous and heterogeneous catalyst systems. In general, the catalysts suitable for the preparation process are based on a transition metal from transition group 6, 7 or 8 of the Periodic Table, with preference being given to the use of catalysts based on Mo, W, Re and Ru.

Suitable homogeneous catalyst systems are generally transition metal compounds, which, if appropriate in combination with a cocatalyst and/or, if appropriate, in the presence of the olefin reactants, are capable of forming a catalytically active metal carbene complex. Such systems are described, for example, by R. H. Grubbs in Comprehensive Organometallic Chemistry, Pergamon Press, Ltd., New York, volume 8, page 499 ff. (1982).

Suitable catalyst/cocatalyst systems based on W, Mo and Re may comprise, for example, at least one soluble transition metal compound and an alkylating agent. Examples include $MoC_2$ $(NO)_2$ $(PR_3)_2/Al_2$ $(CH_3)_3Cl_3$; $WCl_6/BuLi$; $WCl_6/EtAlCl_2$ $(Sn(CH_3)_4)/EtOH$; $WOCl_4/Sn$ $(CH_3)_4$; $WOl_6$ $(O-[2,6-Br_2-C_6H_3]/Sn$ $(CH_3)_4$; $CH_3ReO_3/C_2H_5AlCl_2$, with the four last-mentioned ones being preferred for the process of the invention.

Further transition metal-alkylidene complexes suitable as metathesis catalysts are described by R. R. Schrock in Accounts of Chemical Research, Volume 23, page 158 ff. (1990). In general, the complexes in question are tetracoordinated Mo- and W-alkylidene complexes additionally containing two bulky alkoxy ligands and one imido ligand. For the process of the invention, preference is given to $((CH_3)_3CO)_2Mo(=N-[2,6-(i-C_3H_7)_2-C_6H_3)$ $(=CHC(CH_3)_2C_6H_5)$ and $[(CF_3)_2C(CH_3)O]_2Mo$ $(=N-[2,5-(i-C_3H_7)=C_6H_3])(=CH(CH_3)_2C_6H_5$.

In particular, homogeneous metathesis catalysts used are the catalysts described in Angewandte Chemie, Volume 107, pages 2179 ff. (1995), in Journal of the American Chemical Society, Volume 118, page 100 ff. (1996), and in Journal of the Chemical Society, Chemical Communications, page 1127 ff. (1995). In particular, these include $RuCl_2(=CHR)$ $(PR'_3)_2$, preferably $RuCl_2(=CHC_6H_5)$ $(P(C_6H_{11})_3)_2$, $(\eta^6$-p-cymene) $RuCl_2$ $(p(C_6H_{11})_3)$ and 3 molar equivalents of diazoalkane $((CH_3)_3SiCHN_2$ or $C_6H_5CHN_2)$ produced "in situ".

Suitable heterogeneous catalyst systems generally comprise a transition metal compound on an inert support, said compound being capable without a cocatalyst of forming a catalytically active alkylidene complex by reaction with the olefin reactants. It is preferred to use $Re_2O_7$ and $CH_3ReO_3$.

Suitable inorganic supports are the oxides customary for this purpose, especially silicon oxides and aluminum oxides, aluminosilicates, zeolites, carbides, nitrides, etc., and mixtures thereof. Preferred supports used are $Al_2O_3$, $SiO_2$ and mixtures thereof, in combination with $B_2O_3$ and $Fe_2O_3$ if desired.

The aforementioned homogeneous and heterogeneous catalyst systems differ greatly in their catalytic activity, so that the individual catalysts may have different optimum reaction conditions for the metathesis. As already described above, the catalytic activity with respect to the cross-metathesis (step a)) also influences the product distribution of the oligomer mixtures I derived from cyclopentene. For instance, the ruthenium-based homogeneous catalyst systems $RuCl_2$ $(=CHC_6H_5)$ $(P(C_6H_{11})_3)_3$, $(\eta^6$-p-cymene) $RuCl_2$ $(P(C_6H_{11})/(CH_3)_3SICHN_2$ and $(\eta^6$-p-cymene) $RuCl_2$ $(P(C_6H_{11})_3)/C_6H_5CHN_2$ are particularly suitable for the preparation process. Of these, the first-mentioned ruthenium complex has a higher catalytic activity than the two last-mentioned ones, which under otherwise identical reaction conditions leads to higher space/time yields. At the same time, however, there is also an increased incidence of cross-metathesis in the case of the first complex, with the release, in part, of ethene as well, with the consequence that the resulting oligomer mixture III derived from cyclopentene has a somewhat smaller fraction of double bonds, which is manifested, for example, in a lower iodine number. Furthermore, owing to the cross-metathesis, a larger number of acyclic olefins without terminal double bonds is available, so that using the first-mentioned homogeneous ruthenium catalyst the proportion of oligomers I derived from cyclopentene having only one, or no, terminal double bond is increased. The two last-mentioned ruthenium complexes have a somewhat lower catalytic activity than the first-mentioned one, so that using them, in accordance with the process of the invention, cyclopentene-derived oligomer mixtures I are obtained which have a higher double bond fraction and thus a higher iodine number and also a larger fraction of terminal double bonds.

The heterogeneous catalyst systems as well have the above-described activity differences with the corresponding influence on the metathesis products. If $CH_3ReO_3$ on $Al_2O_3$ is used as a heterogeneous catalyst for the preparation process, it has a higher catalytic activity than the corresponding homogeneous catalyst system comprising $CH_3ReO_3/(C_2H_5)AlCl_2$.

As a heterogeneous catalyst it is advantageous to use $Re_2O_7$ on $Al_2O_3$. This has an activity approximately comparable with that of $RuCl_2(=CHC_6H_5)$ $(P(C_6H_{11})_3)_2$ and also similar product distribution, and may be used again following regeneration in a stream of air at elevated temperatures, such as about 550° C., for example.

If desired, therefore, depending on the catalyst used, it is possible to obtain cyclopentene-derived oligomer mixtures III having varying double bond fractions and varying fractions of terminal double bonds.

In one specific embodiment of the preparation process, the metathesis catalyst used is a homogeneous, ruthenium-based catalyst selected from $RuCl_2(=CHC_6H_5)$ $(P_6H_{11})_3)_2$, $(\eta^6$-p-cymene) $RuCl_2$ $(P$ $(C_6H_{11})_3)/(CH_3)_3SiCHN_2$ and $(\eta^6$-p-cymene)$RuCl_2$ $(P(C_6H_{11})_3)/C_6H_5CHN_2$, which is added to the reaction mixture as a solution in an organic solvent. Examples of suitable solvents are aromatic hydrocarbons, such as toluene and xylene, and also halogenated alkanes, such as $CH_2Cl_2$, $CHCl_3$, etc.

In the case of reactive catalyst systems, the reaction temperature is from −20 to 200° C., preferably from 0 to 100° C., in particular from 20 to 80° C.

The reaction may be conducted at an increased pressure up to 5 bar, preferably up to 2 bar, or, with particular preference, at ambient pressure.

According to another specific embodiment of the preparation process, the metathesis catalyst used is a heterogeneous catalyst based on rhenium, selected from $CH_3ReO_3/Al_2O_3$ preferably $Re_2O_7/Al_2O_3$, which is added to the reaction mixture without addition of solvent.

In the case of these catalysts, which are somewhat less active than the aforementioned homogeneous catalyst systems, the reaction temperature is from about 20 to 120° C., in particular from 40 to 80° C.

The reaction is preferably conducted at an increased pressure from 2 to 20 bar, preferably from 3 to 15 bar, in particular from 4 to 12 bar.

In terms of process regime, the preparation process can be performed either continuously or batchwise. Suitable reaction apparatuses are known to the skilled worker and are described, for example, in Ullmanns Enzyklopädie der technischen Chemie, Volume 1, page 743 ff. (1951). They include stirred vessels for the batchwise process, for example, and tube reactors for the continuous process, for example.

According to a suitable batchwise variant of the preparation process it is possible, for example, to react the $C_5$ cut over one of the homogeneous ruthenium catalysts described above as being preferred, which if desired is generated "in situ" in the reactor vessel, in a metathesis reaction to give the cyclopentene-derived oligomer mixture I.

According to a further suitable continuous variant of the preparation process, the $C_5$ cut may be reacted, for example, in a tube reactor over one of the heterogeneous rhenium catalysts described above as being preferred.

In accordance with both possible process variants, and depending on the catalyst used and on the other reaction parameters, especially the reaction temperature, space/time yields of at least $10 \text{ g l}^{-1} \text{ h}^{-1}$ h, preferably at least $15 \text{ g l}^{-1} \text{h}^{-1}$, are achieved. Depending on the activity of the catalyst, however, it is also possible to obtain substantially higher space/time yields of up to about $500 \text{ g l}^{-1} \text{ h}^{-1}$.

The reaction mixture is separated by customary methods. These include, for example, fractional distillation, at atmospheric or reduced pressure, or separation at elevated temperatures and atmospheric pressure in a falling-film evaporator. Low-boiling fractions containing still-unreacted olefins may if desired be recycled to the reaction apparatus. Advantageously, more extensive reaction of the olefins present in the $C_5$ cut to oligomers III is achieved in the course of the preparation process, so that the low boilers which are separated off comprise a $C_5$ hydrocarbon mixture with predominantly saturated cyclic and acyclic compounds.

As described above, the number and position of the double bonds in the oligomers III may be influenced by the reaction conditions, especially the catalyst that is used in each case. According to the process described, cyclopentene oligomers III are obtained, where the iodine number is at least 250 g $I_2$/100 g oligomers I, preferably at least 300 g $I_2$/100 g oligomers I.

The average molecular weight of these oligomers III derived from cyclic monoolefins, especially cyclopentene, is at least 274 g/mol, which corresponds to an average conversion of three cyclopentene units per oligomer III, with chain termination by an acyclic pentene (and not by a cross-metathesis product) being assumed in this case.

In order to prepare the reactive diluents for use in accordance with the invention, the oligomers III detailed above are subjected to customary and conventional hydroformylation. Here, in general, the oligomers III are reacted with hydrogen and carbon monoxide in the presence of catalysts containing suitable transition metals under atmospheric pressure or under superatmospheric pressure at temperatures from 50 to 150° C. to give products III containing aldehyde groups.

An example of a suitable transition metal is rhodium.

The resultant products III are isolated and are reduced in a customary and known manner to the reactive diluents for use in accordance with the invention. Reducing agents suitable for this purpose are all those with which aldehyde groups can be reduced to hydroxyl groups. Examples of suitable reducing agents are borohydrides, such as sodium tetrahydroboranate, or hydrogen in the presence of hydrogenation catalysts.

Examples of suitable hydroformylation and reduction processes are described in the European patent EP-A-0 502 839.

The reactive diluents particularly preferred in accordance with the invention may be subjected in a customary and known manner to partial or complete hydrogenation. Suitable reducing agents for this purpose include those mentioned above.

The reactive diluents particularly preferred in accordance with the invention have a hydroxyl number (OHN) of from 200 to 650, in particular from 250 to 450. Their number-average molecular weight $M_n$, determined with the aid of gel permeation chromatography using polystyrene as the internal standard, lies within the range from 400 to 1 000, in particular from 400 to 600. Their mass-average molecular weight $M_w$, determined with the aid of gel permeation chromatography and polystyrene as the internal standard, lies within the range from 600 to 2 000, in particular from 600 to 1 100. The polydispersity $M_n/M_w$ is from 1.4 to 3, in particular from 1.7 to 1.9.

A particularly outstanding reactive diluent for use in accordance with the invention has an OHN of 350, an $M_n$ of 561 and an $M_w$ of 1 068.

Further examples of reactive diluents which are particularly preferred in accordance with the invention are the epoxides described below, which before or after the (co)polymerization, and especially before the (co)polymerization, are reacted with low molecular mass monocarboxylic and/or polycarboxylic acids to give polyols, which in turn are used as reactive diluents in the case of the crosslinking by way of the hydroxyl groups.

Further examples of reactive diluents particularly preferred in accordance with the invention are compounds containing epoxide groups, such as glycidyl ethers of polyols or polyphenols such as glycerol, diglycerol, glucitol, erythritol, pentaerythritol, dipentaerythritol, trimethylolpropane, trimethylolethane, ditrimethylolpropane, ditrimethylolethane, tetrakis (2-hydroxyethyl)-ethane, tetrakis (3-hydroxypropyl) methane, the above-described tetraols II1 to II10, the above-described hyperbranched compounds, the above-described functionalized alkanes, the above-described oligomeric polyols prepared by metathesis, hydroformylation and hydrogenation, pyrocatechol, resorcinol, hydroquinone, pyrogallol, phloroglucinol, p-(hydroxyphenyl)-phloroglucinol, 5-(7-hydroxynaphth-1-yl)-pyrogallol, bisphenol F, bisphenol A or novolaks;

low molecular mass epoxy resins or oligomers which contain monomer (A6) in copolymerized form;

glycidyl esters of Versatic® acids;

epoxy resin esters of saturated and unsaturated fatty acids (epoxidized oils); and epoxidized triglycerides of natural oils and esters.

Of the reactive diluents described in detail above, the diethyloctanediols, especially 2,4-diethyloctane-1, 5-diol, and the oligomeric polyols prepared by metathesis, hydroformylation and hydrogenation, deserve particular attention. In accordance with the invention, these are used with very particular preference as reactive diluents.

A certain fraction of the reactive diluents for use in accordance with the invention in a composition of the invention may be modified, following the (co)polymerization, with suitable olefinically unsaturated compounds, so that the composition of the invention may be cured both thermally and by actinic light and/or electron beams. Examples of suitable compounds for such a modification are the above-described monomers (A2), (A5) or (A6).

The (co)polymerization of the invention in the reactive diluents used in accordance with the invention has no special features in terms of its method and instead takes place with the methods of continuous or batchwise homopolymerization or copolymerization that are customary and known in the plastics field, under atmospheric pressure or superatmospheric pressure in stirred vessels, autoclaves, tube reactors or Taylor reactors.

Examples of suitable (co)polymerization processes are described in the patents DE-A-197 09 465, DE-C-197 09 476, DE-A-28 48 906, DE-A-195 24 182, EP-A-0 554 783, WO 95/27742 or WO 82/02387.

In accordance with the invention, Taylor reactors are advantageous and are therefore used in preference for the process of the invention.

Taylor reactors, which serve to convert substances under the conditions of Taylor flow, are known. They consist essentially of two coaxial concentric cylinders of which the outer is fixed while the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta.

As well as the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$, and the gap width d, the difference between the two radii, in accordance with the following formula:

$$Ta = \omega_i r_i d v^{-1} (d/r_i)^{1/2} \quad (I)$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or a vortex cell.

The basis of this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

Of advantage in accordance with the Taylor reactors having an external reactor wall located within which there is a concentrically or eccentrically disposed rotor, a reactor floor and a reactor lid, which together define the annular reactor volume, at least one means for metered addition of reactants, and a means for the discharge of product, where the reactor wall and/or the rotor are or is geometrically designed in such a way that the conditions for Taylor vortex flow are met over substantially the entire reactor length in the reactor volume, i.e. in such a way that the annular gap broadens in the direction of flow traversal.

As (co)polymerization initiators it is preferred to use initiators which form free radicals. The nature and amount of initiator are normally chosen so that the supply of radicals is very largely constant at the polymerization temperature during the feed phase. As examples of initiators which can be used are the following: dialkyl peroxides, e.g. di-tert-butyl peroxide and dicumyl peroxide, hydroperoxides, e.g. cumene hydroperoxide and tert-butyl hydroperoxide, peresters, e.g. tert-butyl perbenzoate, tert-butyl perpivalate, tert-butyl per-5,5,5-trimethylhexanoate and tert-butyl per-2-ethylhexanoate, or disazo compounds such as azobisisobutyronitrile.

Besides the reactive diluents for use in accordance with the invention, the reaction medium may also comprise further constituents in minor amounts. In the context of the present invention, the term "minor amount" means a fraction of other constituents which does not adversely affect, but which instead advantageously varies, the advantageous profile of properties of the reaction medium that is brought about by the reactive diluents.

Examples of suitable further constituents are water, carbon dioxide, organic solvents or additives which are customary and known in the field of coating compositions, adhesives and sealing compounds. Examples of suitable additives are described below.

The polymerization conditions (reaction temperature, feed time of the monomer mixture and polymerization initiators, possible use of molecular weight regulators, e.g. mercaptans, thioglycolic esters, alpha-diphenylethene, compounds containing nitroxyl radical groups, or hydrogen chloride) are selected so that in particular the polyacrylates prepared with particular preference in accordance with the invention and used have a number-average molecular weight as indicated above (determined by gel permeation chromatography using polystyrene as calibrating substance). The acid number may be adjusted by the skilled worker by using appropriate amounts of component (A5). The same applies to the adjustment of the hydroxyl number and the epoxide number; they can be controlled by way of the amount of component (A4) and/or (A6) used.

The compositions of the invention prepared in accordance with the procedure of the invention have the particular advantage that they may be used directly to prepare the multisubstance mixtures of the invention.

For this purpose, minor amounts of further homopolymers or copolymers may be added to them. In the context of the present invention, the term "minor amounts" indicates that the fractions used should only be those which do not adversely alter, but instead advantageously vary or further improve, the advantageous profile of properties of the compositions of the invention that is brought about by the (co)polymers prepared by the procedure of the invention.

Examples of suitable homopolymers or copolymers which may be added to the compositions of the invention are (meth)acrylate diols, polyethers, polycarbonates, polylactones, acrylated polyesters, acrylated polyurethanes, polyurethanes, polyesters or polyacrylates prepared in other ways.

Suitable polyacrylates are sold, for example, under the brand name Joncryl®, such as, for instance, Joncryl® SCX 912 and 922.5.

Suitable polyester resins and/or alkyd resins are described, for example, in Ullmanns Encykiopädie der technischen Chemie, third edition, volume 14, Urban & Schwarzenberg, Munich, Berlin 1963, pages 80 to 89 and pages 99 to 105, or in the following books: Résines Alkydes-Polyester by J. Bourry, Dunod, Paris 1952, Alkyd Resins by C. R. Martens, Reinhold Publishing Corporation, New York 1961 and Alkyd Resin Technology by T. C. Patton, Interscience Publishers 1962.

Examples of suitable polyurethane resins are the resins described in the patents EP-A-0 708 788, DE-A-44 01 544 and DE-A-195 34 361.

Furthermore, the compositions of the invention may be diluted with customary and known organic solvents or they may be dispersed or dissolved in water or in aqueous media.

Furthermore, for the purposes of preparing the multisubstance mixtures of the invention, further constituents customary in the prior art in the fields of coating compositions, adhesives and sealing compounds are added to the compositions of the invention.

In this context it is also possible to design the multisubstance mixtures of the invention as single-component systems or else as multicomponent systems. Such systems differ essentially in the nature of the crosslinking agent used. In both cases, suitable crosslinking agents include all those which react under curing conditions with the reactive groups of the binders, especially the hydroxyl groups or the epoxide groups. The difference is that, in the case of the multicomponent systems, the appropriate crosslinking agent, owing to its high reactivity, has to be stored separately from the other constituents until shortly before it is used.

Examples of suitable crosslinking agents are amino resins, beta-hydroxyalkylamides, resins or compounds containing siloxane groups, resins or compounds containing anhydride groups, resins or compounds containing carboxyl groups, blocked and unblocked polyisocyanates or alkoxycarbonylaminotriazines, but especially blocked polyisocyanates or tris(alkoxycarbonylamino) triazines.

In both one-component and multicomponent systems, blocked polyisocyanates, or a mixture of blocked polyisocyanates, may be employed.

The blocked polyisocyanates which may be employed are preferably designed such that they contain both isocyanate groups blocked with a blocking agent (Z1) and isocyanate groups blocked with a blocking agent (Z2), the blocking agent (Z1) being a dialkyl malonate or a mixture of dialkyl malonates, the blocking agent (Z2) being a blocking agent containing active methylene groups, an oxime or a mixture of these blocking agents, and being different from (Z1), and the equivalents ratio between the isocyanate groups blocked with (Z1) and the isocyanate groups blocked with (Z2) being between 1.0:1.0 and 9.0:1.0, preferably between 8.0:2.0 and 6.0:4.0, and with particular preference between 7.5:2.5 and 6.5:3.5.

Further suitable blocking agents include dimethylpyrazole and/or substituted triazoles.

A polyisocyanate or a mixture of polyisocyanates is reacted in conventional manner with a mixture of the blocking agents (Z1) and (Z2), the mixture of the blocking agents (Z1) and (Z2) comprising the blocking agents (Z1) and (Z2) in a molar ratio of between 1.0:1.0 and 9.0:1.0, preferably between 8.0:2.0 and 6.0:4.0, and with particular preference between 7.5:2.5 and 6.5:3.5.

The polyisocyanate or mixture of polyisocyanates may be reacted with the mixture of blocking agents (Z1) and (Z2) to the extent that isocyanate groups are no longer detectable. In practice, this may necessitate the use of very large excesses of blocking agents and/or very long reaction times.

It has been found that multisubstance mixtures, especially coating compositions, adhesives and sealing compounds, having good properties are obtained even when at least 50, preferably at least 70 percent of the isocyanate groups of the polyisocyanate or of the mixture of polyisocyanates are reacted with the mixture of the blocking agents (Z1) and (Z2) and the remaining isocyanate groups are reacted with a hydroxyl-containing compound or with a mixture of hydroxyl-containing compounds. Hydroxyl-containing compounds used are preferably low molecular mass aliphatic or cycloaliphatic polyols, such as neopentyl glycol, dimethylolcyclohexane, ethylene glycol, diethylene glycol, propylene glycol, 2-methyl-2-propylpropane-1,3-diol, 2-ethyl-2-butylpropane-1,3-diol, 2,2,4-trimethylpentane-1,5-diol and 2,2,5-trimethylhexane- 1,6-diol, or hydroxyl-containing homopolymers or copolymers.

A suitable blocked polyisocyanate is also obtainable by mixing polyisocyanates blocked with the blocking agent (Z1) or (Z2) in a ratio such as to give a mixture in which the equivalents ratio between the isocyanate groups blocked with (Z1) and the isocyanate groups blocked with (Z2) is between 1.0:1.0 and 9.0:1.0, preferably between 8.0:2.0 and 6.0:4.0, and with particular preference between 7.5:2.5 and 6.5:3.5.

In principle, all of the polyisocyanates known as paint polyisocyanates may be used to prepare the blocked polyisocyanates. It is, however, preferred to use polyisocyanates whose isocyanate groups are attached to aliphatic or cycloaliphatic radicals. Examples of such polyisocyanates are hexamethylene diisocyanate, isophorone diisocyanate, trimethylhexamethylene di-diisocyanate, dicyclohexylmethane diisocyanate, 1,3-bis(2-isocyanatoprop-2-yl)benzene (TMXDI) and 1,4- and 1,3-bis(isocyanatomethyl)cycloalkanes such as 1,4- and 1,3-bis (isocyanatomethyl) cyclohexane and also adducts of these polyisocyanates with polyols, especially low molecular mass polyols, such as trimethylolpropane, for example, and polyisocyanates that are derived from these polyisocyanates and contain isocyanurate groups and/or biuret groups.

Polyisocyanates used with particular preference are hexamethylene diisocyanate or isophorone diisocyanate, polyisocyanates derived from these diisocyanates and containing isocyanate, allophanate, uretdione, iminooxadiazinedione, and/or biuret groups and containing preferably more than two isocyanate groups in the molecule, and reaction products of hexamethylene diisocyanate and isophorone diisocyanate or of a mixture of hexamethylene diisocyanate and isophorone diisocyanate with 0.3–0.5 equivalent of a low molecular mass polyol having a molecular weight of from 62 to 500, preferably from 104 to 204, in particular a triol, such as trimethylolpropane, for example.

As blocking agents (Z1), dialkyl malonates or a mixture of dialkyl malonates are used. Examples of dialkyl malonates which can be used are dialkyl malonates having 1 to 6 carbon atoms in each alkyl radical, such as dimethyl malonate and diethyl malonate, preference being given to the use of diethyl malonate. As blocking agents (Z2), use is made of blocking agents containing active methylene groups, oximes, and mixtures of these blocking agents, all different from (Z1). Examples of blocking agents which may be used as blocking agents (Z2) include the following: methyl, ethyl, propyl, butyl, pentyl, hexyl, heptyl, octyl, nonyl, decyl or dodecyl acetoacetate, acetone oxime, methyl ethyl ketoxime, acetylacetone, formaldoxime, acetaldoxime, benzophenoxime, acetoxime and diisobutyl ketoxime. As blocking agent (Z2) it is preferred to use an alkyl acetoacetate having from 1 to 6 carbon atoms in the alkyl radical or a mixture of such acetoacetates or a ketoxime or mixture of ketoximes. Particular preference is given to the use of ethyl acetoacetate or methyl ethyl ketoxime as blocking agent (Z2).

As crosslinkers it is also possible to use tris(alkoxycarbonylamino)triazines of the formula IV

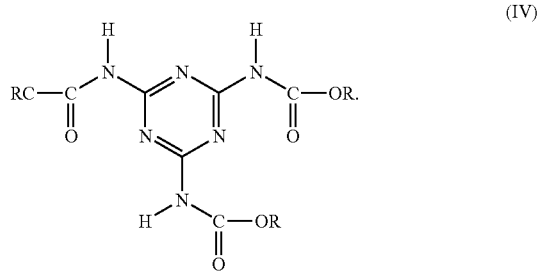

(IV)

Examples of suitable tris (alkoxycarbonylamino) triazines are described in the patents U.S. Pat. No. 4,939,213, U.S. Pat. No. 5,084,541 and EP-A-0 624 577. Use is made in particular of tris(methoxy-, tris(butoxy- and/or tris (2-ethylhexoxycarbonylamino) triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize out.

It is likewise possible to use amino resins, examples being melamine resins. In this context it is possible to use any amino resin suitable for transparent topcoats or clearcoats, or a mixture of such amino resins. Particularly suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP-B-0 245 700 and also in the article by B. Sing and coworkers, "Carbamylmethylated Melamines, Novel Crosslinkers for the Coatings Industry" in Advanced organic Coatings Science and Technology Series, 1991, Volume 13, pages 193 to 207.

Examples of suitable beta-hydroxyalkylamides are N,N, N',N'-tetrakis (2-hydroxyethyl)adipamide or N,N,N',N'-tetrakis (2-hydroxypropyl)adipamide.

In the case of the multicomponent systems, especially the two-component systems, the crosslinking agent used comprises at least one unblocked polyisocyanate dissolved, if appropriate, in one or more organic solvents. In addition, however, it is also possible to use one of the above-described blocked polyisocyanates as well.

The unblocked or part-blocked polyisocyanates comprise any desired organic polyisocyanates, especially paint polyisocyanates, having free isocyanate groups attached to aliphatic, cycloaliphatic, araliphatic and/or aromatic moieties. Preference is given to using polyisocyanates having from 2 to 5 isocyanate groups per molecule and having viscosities from 100 to 2 000 mPa·s (at 23 degrees C.). It is also possible to use part-blocked polyisocyanates of the German patent DE-A-196 09 617. If desired, small amounts of organic solvent may be added to the polyisocyanates, preferably from 1 to 25% by weight based on polyisocyanate alone, in order to improve the ease of incorporation of the polyisocyanate and, where appropriate, to lower the viscosity of the polyisocyanate to a level within the abovementioned ranges.

Examples of suitable solvents for the polyisocyanates are ethoxyethyl propionate, butyl acetate and the like. Examples of suitable isocyanates, are described in "Methoden der organischen Chemie", Houben-Weyl, Volume 14/2, 4th Edition, Georg Thieme Verlag, Stuttgart, 1963, pages 61 to 70, and by W. Siefken, Liebigs Annalen der Chemie, Volume 562, pages 75 to 136.

Further examples of suitable polyisocyanates are isocyanato-containing polyurethane prepolymers, which are prepared by reacting polyols with an excess of polyisocyanates and are preferably of low viscosity. It is also possible to use polyisocyanates containing isocyanurate, uretdione, iminooxadiazinedione, biuret, allophanate, urethane and/or urea groups. Polyisocyanates containing urethane groups, for example, are obtained by reacting some of the isocyanate groups with polyols, such as trimethylol-propane and glycerol, for example. Preference is given to using aliphatic or cycloaliphatic polyisocyanates, especially hexamethylene diisocyanate, dimerized and trimerized hexamethylene diisocyanate, isophorone diiisocyanate, 2-isocyanatopropylcyclohexyl isocyanate, dicyclohexylmethane 2,4'-diisocyanate or dicyclohexylmethane 4,4'-diisocyanate, or mixtures of these polyisocyanates.

Very particular preference is given to using mixtures of polyisocyanates based on hexamethylene diisocyanate and containing uretdione and/or isocyanurate groups and/or allophanate groups, as are formed by catalytic oligomerization of hexamethylene diisocyanate using appropriate catalysts. The polyisocyanate constituent may, furthermore, consist of any desired mixtures of the free polyisocyanates exemplified.

The multisubstance mixtures according to the invention may furthermore comprise UV absorbers; free-radical scavengers; crosslinking catalysts, especially organometallic compounds, preferably organotin/organo-bismuth compounds or tertiary amines; rheology aids, especially those known from the patents WO 94/22968, EP-A-0 276 501, EP-A-0 249 201 and WO 97/12945; pigments and fillers of any kind, examples being color pigments such as azo pigments, phthalocyanine pigments, carbonyl pigments, dioxazine pigments, titanium dioxide, carbon black, iron oxides or chromium oxides and/or cobalt oxides, effect pigments such as metal flake pigments, especially aluminum flake pigments, and pearlescent pigments, or fillers such as chalk, calcium sulfates, barium sulfate, silicates such as talc or kaolin, silicas, oxides such as aluminum hydroxide or magnesium hydroxide, or organic fillers such as textile fibers, cellulose fibers, polyethylene fibers or wood flour; slip additives; polymerization inhibitors; defoamers; leveling agents or film formation auxiliaries, e.g., cellulose derivatives; or other additives, commonly employed in coating compositions, adhesives or sealing compounds.

These additives are commonly used in an amount of up to 15% by weight, preferably from 2 to 9% by weight, based on the weight of the respective multisubstance mixture of the invention without pigments and without fillers.

The preparation of the multisubstance mixtures of the invention has no special features in terms of the technical process; rather, the customary methods, such as the combining of the individual constituents and their mixing with stirring, are employed. The preparation of the multisubstance mixtures of the invention consisting of two or more components is likewise carried out by means of stirring or dispersion using the commonly employed apparatuses, for example, by means of dissolvers or by means of customary two-component or multicomponent metering and mixing units. The individual components are stored separately until being used as intended.

The multisubstance mixtures of the invention are used in particular as coating compositions, adhesives and sealing compounds.

The coating composition of the invention is used in particular to produce films, coated moldings, composites or complex components, especially vehicle bodies, which consist of or comprise films, glass, wood, paper and/or metal, by applying the coating compositions to the moldings, composites or complexed components in question and curing the resultant coating.

The coating composition of the invention is used preferably to produce single-coat or multicoat systems and with particular preference to produce topcoats. However, it may also be intended for the production of a clearcoat to be applied over a basecoat film, for example, a clearcoat of a multicoat system produced by the wet-on-wet techniue. Furthermore, it may also be used as a primer, primer-surfacer, or as underbody protection. Of course, the plastics or the other substrates may also be coated directly with the clearcoat or topcoat material.

The coating compositions of the invention may be used both for the OEM finishing and for the refinishing of vehicle bodies, especially automobile bodies, including mounted plastic components.

The adhesive of the invention is used to produce bonded composites which consist of or comprise films, plastics, glass, wood, paper and/or metal, by applying the adhesive to the adherent surface(s) of a film or of a molding consisting of or comprising plastic, glass, wood, paper and/or metal and/or to the surface(s) of the part to be bonded thereto, and subjecting it to initial curing if desired, after which the surfaces to be bonded are brought into contact, and then the adhesive is cured to completion.

The application of the coating composition of the invention and of the adhesive of the invention is generally made using customary methods, such as spraying, knifecoating, dipping, brushing or coil coating, for example.

The sealing compound of the invention is used for hermetic sealing of the joints in composites and complex components, especially vehicle bodies, which are composed of different moldings and composites. To this end, the sealing compound of the invention is introduced into the joints, by spraying or pouring, for example, and is thermally cured together, if desired, with the adhesives and/or coating compositions that are likewise used.

The coating compositions, adhesives or sealing compounds of the invention are preferably cured at temperatures from room temperature up to 240° C. Temperatures between 60 and 180° C. are particularly preferred. In specific embodiments of the coating compositions of the invention it is also possible to employ lower curing temperatures of from 60 to 160° C.

Moldings, composites and complex components which consist of or comprise films, plastics, glass, wood, paper and/or metal and include at least one coat of the fully cured binder, at least one film of the fully cured adhesive and/or at least one joint sealed with a fully cured sealing compound of the invention have distinct advantages over conventional moldings, composites and components in terms of thermal stability, light stability, scratch resistance and weather stability, resulting over all in a longer lifetime.

EXAMPLES

Example 1

Preparation of a Composition of the Invention

A 4 l steel reactor suitable for the polymerization and equipped with ref lux condenser and two metering vessels was charged with 935 g of 2,4-diethyloctane-1,5-diol and this initial charge was heated to 165° C. A mixture of 225 g of butyl acrylate, 225 g of styrene and 258 g of hydroxyethyl methacrylate and also 57 g of di-tertbutyl peroxide was added to this initial charge at a uniform rate over the course of three hours. Thereafter, the batch was stirred at 165° C. for three hours. This gave a composition of the invention having a viscosity of 155.2 dpas. The composition of the invention was outstandingly suitable for the preparation of coating compositions, sealing compounds and adhesives.

Example 2

Preparation of a Composition of the Invention

In the steel reactor described above, 586.3 g of 2,4-diethyloctane-1,5-diol were heated to 150° C. A mixture of 390.6 g of styrene, 254.6 g of methyl methacrylate, 339.4 g of tert-butylcyclohexyl acrylate, 101.8 g of butyl methacrylate and 611 g of hydroxypropyl methacrylate was added to this initial charge over the course of four hours. Starting 15 minutes before this feed, a mixture of 170.7 g of xylene and 41.1 g of di-tert-butyl peroxide was metered in over the course of four hours and 45 minutes. Thereafter, polymerization was continued for two hours and the resulting composition of the invention was diluted with 155.3 g of butyl acetate. The dilute composition of the invention had a viscosity of 1.3 dpas and was outstandingly suitable for preparing coating compositions.

Example 3

Preparation of a Composition of the Invention

The steel reactor described above was charged with 597 g of a hydroformylated and subsequently hydrogenated oligomer (oligomeric polyol) as hydroxyl-containing reactive diluent, and this initial charge was heated to 130° C.

The hydroformylated and hydrogenated oligomer itself had been prepared by metathesis of acyclic monoolefins and cyclic monoolefins, hydroformylation of the resulting oligomers and subsequent hydrogenation, the cyclic monoolefin used being cyclopentene and acyclic monoolefins being hydrocarbon mixtures obtained in petroleum processing by cracking ($C_5$ cut). The resultant oligomeric polyol had an OH number of 350, a viscosity of 27.2 dpas at 23°, a number-average molecular weight $M_n$ of 561 and a mass-average molecular weight $M_w$ of 1 068.

A mixture of 120 g of styrene, 115.6 g of methyl methacrylate, 63.8 g of Methacrylester 13 (13-MA from Röhm), 144 g of butyl methacrylate and 136.4 g of hydroxyethyl methacrylate was metered in to this initial charge over the course of four hours (monomer feed I). Commencing five minutes before this feed, a mixture of 90.4 g of the above-described oligomeric polyol and 55.4 g of tert-butylperoxy-2-ethylhexanoate was metered in over the course of four hours and 30 minutes. After two hours and 30 minutes of the monomer feed I, a mixture of 57.2 g of hydroxyethyl acrylate, 27.5 g of acrylic acid and 19.7 g of the above-described oligomeric polyol was metered in (monomer feed II). The reaction mixture was subsequently polymerized at 130° C. for two hours.

The resultant composition of the invention was outstandingly suitable for the preparation of coating compositions and sealing compounds.

What is claimed is:

1. A liquid composition prepared by copolymerizing olefinically unsaturated compounds in a reaction medium of reactive diluents wherein the reactive diluents comprise polyols selected from the group consisting of
   (i) hyperbranched compounds containing (a) a tetrafunctional central group derived from at least one of ditrimethylolpropane, diglycerol, ditrimethylolethane and (b) a tetrafunctional central group of the general formula I

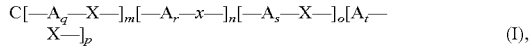
   (I), in which the indices and variables have the following definitions:
   m+n+o+p=4; where
   m is an integer from 1 to 3, and
   n, o and p are 0 or an integer from 1 to 3;
   q, r, s and t are an integer from 1 to 5, where q≧r, s, t,
   X is —O—, —S— or —NH—;
   A is —CR$_2$—; where
   R is selected from the group consisting of —H, —F, —Cl, —Br, —CN, —NO$_2$ $C_1$–$C_3$ alkyl or haloalkyl or $C_1$–$C_3$ alkoxy radical or, if q, r, s and/or t are at least 2, R is selected from the group consisting of a $C_2$–$C_4$ alkanediyl, oxaalkanediyl radical having 2 to 5 carbon atoms an oxygen atom —O— which bridges from 3 to 5 carbon atoms of the radical —A— and mixtures thereof; and
   (iii) polyols obtained by hydroformylating oligomers of the formula (III),

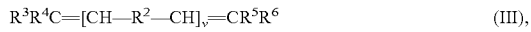
   (III), in which R$^2$ is —(—CH$_2$—)$_w$—,
   in which w is an integer from 1 to 6, or

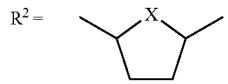

in which X is —CH$_2$— or an oxygen atom;

R$^3$, R$^4$, R$^5$ and R$^6$ independently of one another are hydrogen atoms or alkyl of from $C_1$ to $C_{10}$ carbon chain length; and
the index v is an integer from 1 to 15.

2. A liquid composition of claim 1, wherein the polyols (I) used comprise
   a hyperbranched compound obtained by reacting 2,2-bishydroxymethylbutane-1,4-diol with phthalic anhydride and then reacting the resultant intermediate with glycidyl esters of tertiary, highly branched, saturated monocarboxylic acids,
   the polyols (ii) used comprise dialkyloctanediols, and
   the polyols (iii) used comprise hydroformylated and hydrogenated oligomers, obtained by metathesis from acyclic monoolefins and cyclic monoolefins, hydroformylation of the resultant oligomers and subsequent hydrogenation, the cyclic monoolefin used comprising cyclopentene and the acyclic monoolefins used comprising hydrocarbon mixtures obtained in petroleum processing by cracking ($C_5$ cut), and the polyols (iii) having a hydroxyl number (OHN) of from 200 to 60, a number-average molecular weight $M_n$, of from 400 to 1 000, a mass-average molecular weight $M_w$, in the range from 600 to 2 000, and a polydispersity $M_n/M_w$, from 1.4 to 3.

3. A liquid composition of claim 1, wherein the reactive diluents containing epoxide groups comprise
   (iv) glycidyl ethers of polyols or polyphenols such as glycerol, diglycerol, glucitol, erythritol, pentaerythritol, dipentaerythritol, trimethylol propane, tri methylol ethane, ditrimethylolpropane, ditrimethylolethane, tetrakis(2-hydroxyethyl)ethane, tetrakis(3-hydroxypropyl)methane, the tetraols II1 to II10:

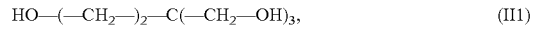 (II1)

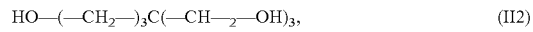 (II2)

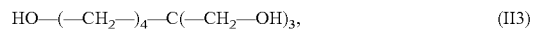 (II3)

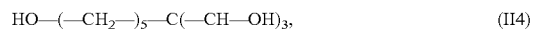 (II4)

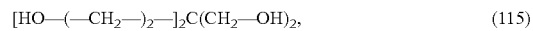 (II5)

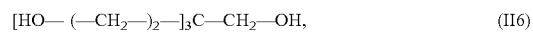 (II6)

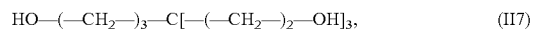 (II7)

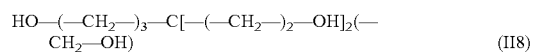 (II8)

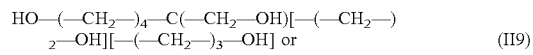 (II9)

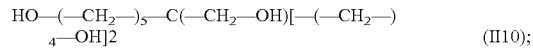 (II10);

the polyols (i), (ii) and (iii), pyrocatechol, resorcinol, hydroquinone, pyrogallol, phloroglucinol, (p-hydroxy-phenyl) phloroglucinol, 5-(7-hydroxynaphth-I-yl)pyrogallol, bisphenol F, bisphenol A or novolaks;
   (v) low molecular mass epoxy resins or oligomers which contain glycidyl-containing monomers (A6) in copolymerized form;
   (vi) glycidyl esters of Versatic® acid;
   (vii) epoxy resin esters of saturated and unsaturated fatty acids; and
   (viii) epoxidized triglycerides of natural oils and esters, and mixtures thereof.

4. A process for preparing a liquid composition according to claim 1 comprising polymerizing by free-radical copolymerization in a liquid reaction medium, which comprises using, as the reaction medium, reactive diluents for thermally curable multisubstance mixtures.

5. The process as claimed in claim 4, wherein a fraction of the reactive diluents is modified after the copolymerization with olefinically unsaturated compounds, so that the resulting liquid composition is curable by means selected from thermal, actinic light, and electron beams, and mixtures thereof.

6. A liquid composition of claim 1, wherein the polyols (iii) have a hydroxyl number (OHN) of from 250 to 450, a number-average molecular weight $M_n$, of from 400 to 600, a mass-average molecular weight $M_w$, in the range from 600 to 1100, and a polydispersity $M_n/M_w$, from 1.7 to 1.9.

7. The composition of claim 1 wherein said composition comprises a homopolymer or copolymer.

8. A homopolymer or copolymer as claimed in claim 7, wherein the polyols used comprise
(i) hyperbranched compounds containing a tetrafunctional central group derived from compounds selected from the group consisting of ditrimethylolpropane, diglycerol, ditrimethylolethane and mixtures thereof, and a tetrafunctional central group of the general formula I

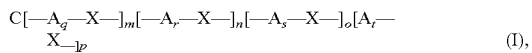

(I), in which the indices and variables have the following definitions:
m+n+o+p=4; where
m is an integer from 1 to 3, and
n, o and p are o or an integer from 1 to 3;
q, r, s and t are an integer from 1 to 5, where q>r, s, t;
X is —O—, —S— or —NH—;
A is —CR$_2$—; where
R is selected from the group consisting of —H, —F, —Cl, —Br, —CN, —NO$_2$ C$_1$–C$_3$ alkyl or haloalkyl or C$_1$–C$_3$ alkoxy radical or, if q, r, s and/or t are at least 2, R is a C$_2$–C$_4$ is selected from the group consisting of alkanediyl and oxaalkanediyl radicals having 2 to 5 carbon atoms and an oxygen atom —O— which bridges from 3 to 5 carbon atoms of the radical —A—;
(ii) cyclic and/or acyclic C$_9$–C$_{16}$ alkanes functionalized with at least two hydroxyl groups or at least one hydroxyl group and at least one thiol group;
(iii) polyols obtained by hydroformylating oligomers of the formula (III), $R^3R^4C$=[CH—$R^2$—CH]$_v$=CR$^5$R$^6$  (III), in which R$^2$ is —(—CH$_2$—)$_w$—,
in which the index w is an integer from 1 to 6, or

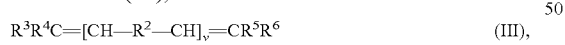

in which X is —CH$_2$— or an oxygen atom;
R$^3$, R$^4$, R$^5$ and R$^6$ independently of one another are hydrogen atoms or alkyl; and
the index v is an integer from 1 to 15.

9. A homopolymer or copolymer of claim 8, wherein the polyols (i) used comprise
a hyperbranched compounds obtained by reacting 2,2-bishydroxymethylbutane-1,4-diol with phthalic anhydride and then reacting the resultant intermediate with glycidyl esters of tertiary, highly branched, saturated monocarboxylic acids,
the polyols (ii) used comprise dialkyloctanediols, and
the polyols (iii) used comprise hydroformylated and hydrogenated oligomers, obtained by metathesis from acyclic monoolefins and cyclic monoolefins, hydroformylation of the resultant oligomers and subsequent hydrogenation, the cyclic monoolefin used comprising cyclopentene and the acyclic monoolefins used comprising hydrocarbon mixtures obtained in petroleum processing by cracking (C$_5$ cut), and the polyols (iii) having a hydroxyl number (OHN) of from 200 to 60, a number-average molecular weight $M_n$, of from 400 to 1 000, a mass-average molecular weight $M_w$, in the range from 600 to 2 000, and a polydispersity $M_n/M_w$, from 1.4 to 3.

10. A homopolymer or copolymer of claim 7, wherein the polyols (iii) used in polymerization of the homopolymer or copolymer have a hydroxyl number (OHN) of from 250 to 450, a number-average molecular weight $M_n$, Of from 400 to 600, a mass-average molecular weight $M_w$, in the range from 600 to 1100, and a polydispersity $M_n/M_w$, from 1.7 to 1.9.

11. A homopolymer or copolymer of claim 7, wherein the reactive diluents containing epoxide groups comprise
(iv) glycidyl ethers of polyols or polyphenols such as glycerol, diglycerol, glucitol, erythritol, pentaerythritol, di pentaerythritol, trimethylol propane, trimethylolethane, ditrimethylolpropane, ditrimethylolethane, tetrakis(2-hydroxyethyl)ethane, tetrakis(3-hydroxypropyl)methane, the tetraols II1 to II10:

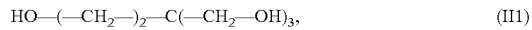 (II1)

 (II2)

 (II3)

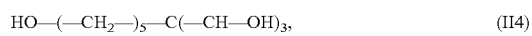 (II4)

 (II5)

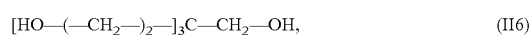 (II6)

 (II7)

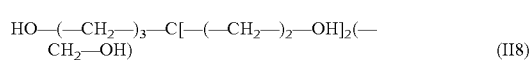 (II8)

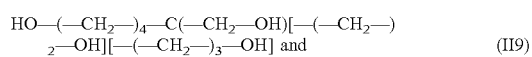 (II9)

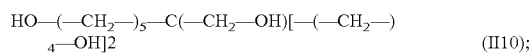 (II10);

the polyols (i), (ii) and (iii), pyrocatechol, resorcinol, hydroquinone, pyrogallol, phloroglucinol, (p-hydroxyphenyl)phloroglucinol, 5-(7-hydroxynaphth-I-yl)pyrogallol, bisphenol F, bisphenol A or novolaks;
(v) low molecular mass epoxy resins or oligomers which contain glycidyl-containing monomers (A6) in copolymerized form;
(vi) glycidyl esters of Versatic® acid;
(vii) epoxy resin esters of saturated and unsaturated fatty acids; and
(viii) epoxidized triglycerides of natural oils and esters, and mixtures thereof.

12. A liquid composition prepared by copolymerizing olefinically unsaturated compounds in a reaction medium of reactive diluents wherein the reactive diluents comprise polyols selected from the group consisting of hyperbranched compounds containing (a) a tetrafunctional central group derived from at least one of ditrimethylolpropane, diglycerol, ditrimethylolethane and (b) a tetrafunctional central group of the general formula I

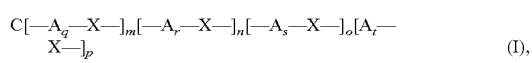
(I), in which the indices and variables have the following definitions:

m+n+o+p=4; where
m is an integer from 1 to 3, and
n, o and p are 0 or an integer from 1 to 3;
q, r, s and t are an integer from 1 to 5, where $q \geq r, s, t$,
X is —O—, —S— or —NH—;
A is —CR$_2$—; where
  R is selected from the group consisting of —H, —F, —Cl, —Br, —CN, —NO$_2$ C$_1$–C$_3$ alkyl or haloalkyl or C$_1$–C$_3$ alkoxy radical or, if q, r, s and/or t are at least 2, R is selected from the group consisting of a C$_2$–C$_4$
alkanediyl, oxaalkanediyl radical having 2 to 5 carbon atoms, an oxygen atom —O— which bridges from 3 to 5 carbon atoms of the radical —A— and mixtures thereof.

13. A liquid composition prepared by copolymerizing olefinically unsaturated compounds in a reaction medium of reactive diluents wherein the reactive diluents comprise polyols selected from the group consisting of polyols obtained by hydroformylating oligomers of the formula (III),

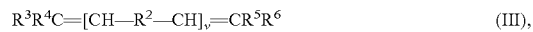
(III), in which R$^2$ is —(—CH$_2$—)$_w$—,
in which w is an integer from 1 to 6, or $R^2 =$ 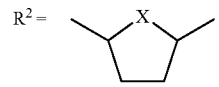

in which X is —CH$_2$— or an oxygen atom;
R$^3$, R$^4$, R$^5$ and R$^6$ independently of one another are hydrogen atoms or alkyl of from C$_1$, to C$_{10}$ carbon chain length; and
the index v is an integer from 1 to 15.

* * * * *